US008108884B2

(12) United States Patent
Nakata et al.

(10) Patent No.: US 8,108,884 B2
(45) Date of Patent: Jan. 31, 2012

(54) OPTICAL DISK RECORDING/REPRODUCING DEVICE AND OPTICAL HEAD

(75) Inventors: Hideki Nakata, Kyoto (JP); Hideki Aikoh, Osaka (JP); Masayuki Shiwa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 345 days.

(21) Appl. No.: 12/438,168

(22) PCT Filed: Aug. 9, 2007

(86) PCT No.: PCT/JP2007/065607
§ 371 (c)(1),
(2), (4) Date: Feb. 20, 2009

(87) PCT Pub. No.: WO2008/023575
PCT Pub. Date: Feb. 28, 2008

(65) Prior Publication Data
US 2010/0182890 A1 Jul. 22, 2010

(30) Foreign Application Priority Data
Aug. 24, 2006 (JP) .................................. 2006-228097

(51) Int. Cl.
G11B 7/00 (2006.01)
G11B 33/14 (2006.01)
(52) U.S. Cl. ........................................ 720/672; 720/649
(58) Field of Classification Search .................. 720/649, 720/671, 658; 360/99.04, 99.08
See application file for complete search history.

(56) References Cited

U.S. PATENT DOCUMENTS

| 2004/0117809 A1 | 6/2004 | Murata et al. |
| 2004/0208093 A1* | 10/2004 | Omori et al. ............... 369/44.32 |
| 2006/0028935 A1* | 2/2006 | Mori et al. ................. 369/44.37 |
| 2006/0055253 A1* | 3/2006 | Mizumaki .................. 310/49 R |

FOREIGN PATENT DOCUMENTS

| JP | 11-259906 | 9/1999 |
| JP | 2003-45068 | 2/2003 |
| JP | 2004-133963 | 4/2004 |
| JP | 2004-342147 | 12/2004 |
| JP | 2005-78735 | 3/2005 |
| JP | 2006-120283 | 5/2006 |

OTHER PUBLICATIONS

International Search Report issued Sep. 18, 2007 in the International (PCT) Application No. PCT/JP2007/065607.

* cited by examiner

Primary Examiner — Joseph Haley
Assistant Examiner — Nicholas Lee
(74) Attorney, Agent, or Firm — Wenderoth, Lind & Ponack, L.L.P.

(57) ABSTRACT

An optical disk recording/reproducing device includes a turntable 7 configured to rotate an optical disk 9 and an optical head 3 configured to record/reproduce information in/from the optical disk 9. A stepping motor 13 to drive a collimator lens 16 is mounted on a head base 17 of the optical head 3 and a part of stator 42 of the stepping motor 13 is exposed through an opening 14a of a head cover 14, an opening 15a of a flexible substrate 15, an opening 13a of a cover 41, and an opening 13b of the cover 41.

12 Claims, 10 Drawing Sheets

OPTICAL DISK RECORDING/REPRODUCING DEVICE AND OPTICAL HEAD

TECHNICAL FIELD

The present invention relates to an optical head that records information in and/or reproduces information from an optical disk and an optical disk recording/reproducing device employing the optical head.

BACKGROUND ART

Normally, an optical disk, such as a DVD and a CD, has a light transmitting layer on a recording layer in which information is recorded. Information is recorded into or reproduced from the recording layer by irradiating light onto the recording layer via the light transmitting layer. In a case where the light transmitting layer has an error in thickness and has a difference from a specified value in this instance, spherical aberration occurs. There is known an optical disk recording/reproducing device configured to correct such spherical aberration, in which a collimator lens formed to be movable is mounted on the optical head, so that the collimator lens is moved to cancel out the spherical aberration according to the thickness of the light transmitting layer (For example, see Patent Document 1).

FIG. 14 is a perspective view showing the configuration of a collimator lens drive mechanism employed in a conventional optical disk recording/reproducing device. A lens drive mechanism 160 shown in FIG. 14 is configured to move a collimator lens so that spherical aberration is cancelled out according to the thickness of the light transmitting layer of an optical disk. It includes a reference shaft 161 and a sub-reference shaft 162 both disposed parallel to the optical axis and a collimator lens holder 163 supported on these reference shafts 161 and 162.

The reference shaft 161 and the sub-reference shaft 162 are immovably attached to a fixing portion of the optical head. The collimator lens holder 163 is supported on these reference shafts 161 and 162 to be movable by sliding in the optical axis direction. The collimator lens operated to move so as to cancel out the spherical aberration is mounted on the collimator lens holder 163. In other words, the lens drive mechanism 160 moves the collimator lens mounted on the collimator lens holder 163 back and forth and parallel to the optical axis direction by moving the collimator lens holder 163 back and forth along the reference shaft 161 and the sub-reference shaft 162.

The lens drive mechanism 160 includes, as drive mechanisms that move the collimator lens holder 163 back and forth along the reference shaft 161 and the sub-reference shaft 162, a DC motor 164 that serves as a drive source to move the collimator lens holder 163 and a gear mechanism 165 that converts rotations of the DC motor 164 into parallel movements along the optical axis direction and transmits the parallel movements to the collimator lens holder 163. Rotations of the DC motor 164 are converted into parallel movements along the optical axis direction by the gear mechanism 165 so as to move the collimator lens holder 163. The collimator lens is thus moved to cancel out the spherical aberration according to the thickness of the light transmitting layer of an optical disk.

The gear mechanism 165 includes a rack 166 attached to the collimator lens holder 163, a first gear 167 attached to the rotation shaft of the DC motor 164 for transmitting a rotational force of the DC motor 164, a second gear 168 to convert rotations of the DC motor 164 into parallel movements along the optical axis direction, a third gear 169 to transmit a drive force that has been converted into the parallel movements along the optical axis direction by the second gear 168 to the rack 166.

The rack 166 to which the drive force is transmitted from the third gear 169 is of a double structure in which two racks 166a and 166b are superimposed and the racks 166a and 166b are coupled with a spring 171 in order to eliminate a backlash between the rack 166 and the third gear 169.

When the collimator lens is moved using the lens drive mechanism 160, the DC motor 164 is rotated. The first gear 167 consequently starts to rotate. Rotations of the first gear 167 are transmitted to the second gear 168 and converted into parallel movements along the optical axis direction. The drive force converted into the parallel movements along the optical axis direction by the second gear 168 is transmitted to the rack 166 via the third gear 169.

The rack 166 is attached to the collimator lens holder 163 and the collimator lens holder 163 is supported on the reference shafts 161 and 162 to be movable by sliding in the optical axis direction. Accordingly, the collimator lens holder 163 is moved in the optical axis direction by the drive force transmitted to the rack 166 via the third gear 169. The collimator lens mounted on the collimator lens holder 163 is thus moved in the optical axis direction.

The lens drive mechanism 160 configured as above is able to move the collimator lens at a high degree of accuracy and is therefore able to cancel out the spherical aberration resulting from a variance in thickness of the light transmitting layer in a satisfactory manner.

Meanwhile, on the part of an optical disk recording/reproducing device, such as a DVD drive, incorporated into a notebook computer or the like, a reduction in thickness and weight of the notebook computer itself raises a need for the optical disk recording/reproducing device to become thinner and lighter.

The optical disk recording/reproducing device employing the lens drive mechanism 160 as described above, however, includes the DC motor 164 having a large diameter. Employing such a DC motor makes it difficult to achieve a thinner optical disk recording/reproducing device.

In addition, because torque of the motor drops off by merely making the diameter of the motor smaller, a larger amount of current has to be flown in order to generate torque as high as conventionally generated torque. In this case, a heat release value by the motor is increased due to a larger amount of current. However, because the optical disk recording/reproducing device that has been made thinner as described above does not have a sufficient space inside, heat cannot be released sufficiently, which poses problems that the torque drops off or the motor itself breaks.

Further, optical disks include a CD and a DVD as well as a BD (Blu-ray Disc) and an HD-DVD achieving the recording at higher density with the use of a blue laser beam, and a multi-DVD drive that records information in and/or reproduces information from these optical disks requires several types of objective lenses corresponding to the respective types of optical disks and optical systems corresponding to the respective types of objective lenses. The number of components therefore increases and it becomes more difficult to make the optical disk recording/reproducing device thinner and hence to release heat.

Patent Document 1: JP-A-11-259906

DISCLOSURE OF THE INVENTION

An object of the invention is to provide an optical head and an optical disk recording/reproducing device capable of releasing heat generated from a drive member sufficiently and preventing adverse effects of foreign matter, such as dust generated from the drive member, as well as making an optical disk recording/reproducing device thinner.

An optical disk recording/reproducing device according to one aspect of the invention includes a rotation member configured to rotate an optical disk and an optical head configured to record information in and/or reproduce information from the optical disk. The optical head includes: a light source that emits light; an objective lens that collects the light emitted from the light source on the optical disk; an objective lens actuator that drives the objective lens in a focus direction and a tracking direction of the optical disk; a movable member that is disposed in an optical path between the light source and the objective lens; a drive member that drives the movable member; and an optical base on which the light source, the objective lens actuator, the movable member, and the drive member are mounted. The drive member includes a rotor and a stator and at least a part of the stator is exposed.

Owing to the configuration above, at least a part of the stator of the drive member is exposed. It thus becomes possible to release heat generated from the drive member sufficiently with an air flow induced by rotations of the optical disk. In addition, foreign matter, such as dust generated from the drive member, is discharged in a direction moving away from the optical disk also along the flow of the air flow. It thus becomes possible to prevent adverse effects of foreign matter, such as dust generated from the drive member. Further, because at least a part of the stator of the drive member is exposed, members that are otherwise disposed in the exposed portion can be omitted. The optical head can be therefore thinner by making the drive member smaller. It thus becomes possible to make the optical disk recording/reproducing device thinner.

BEST MODE FOR CARRYING OUT THE INVENTION

Figure 1:
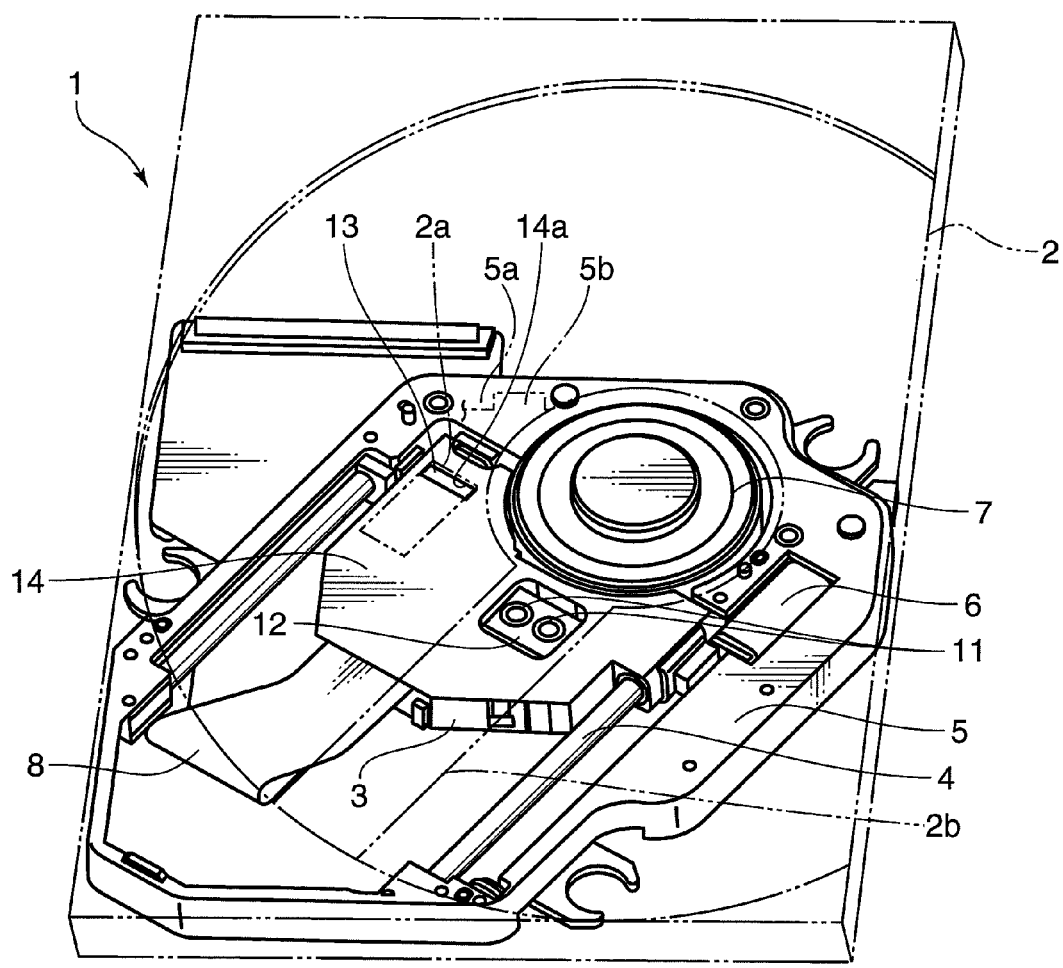
FIG. 1 is a perspective view showing the configuration of an optical disk recording/reproducing device according to a first embodiment of the invention.
Figure 2:
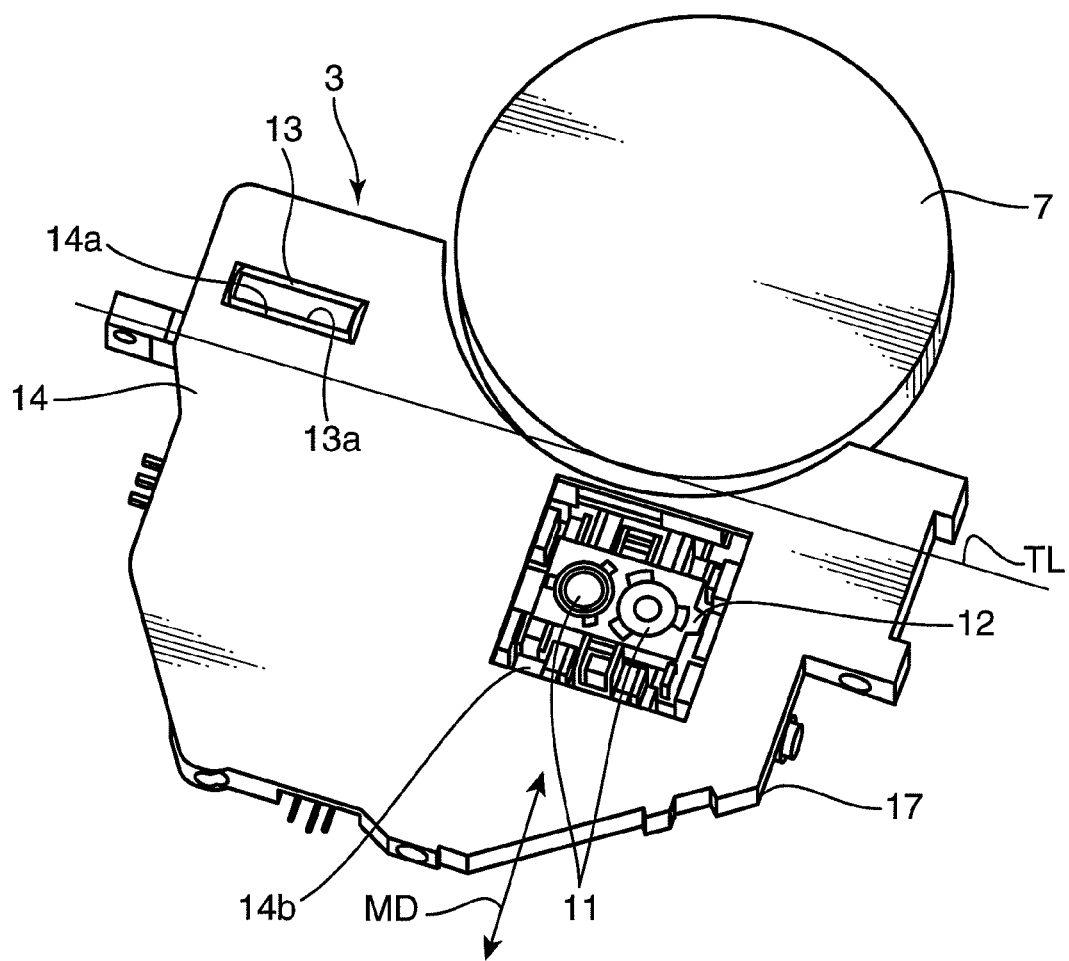
FIG. 2 is a perspective view showing the configuration of an optical head shown in FIG. 1.
Figure 3:
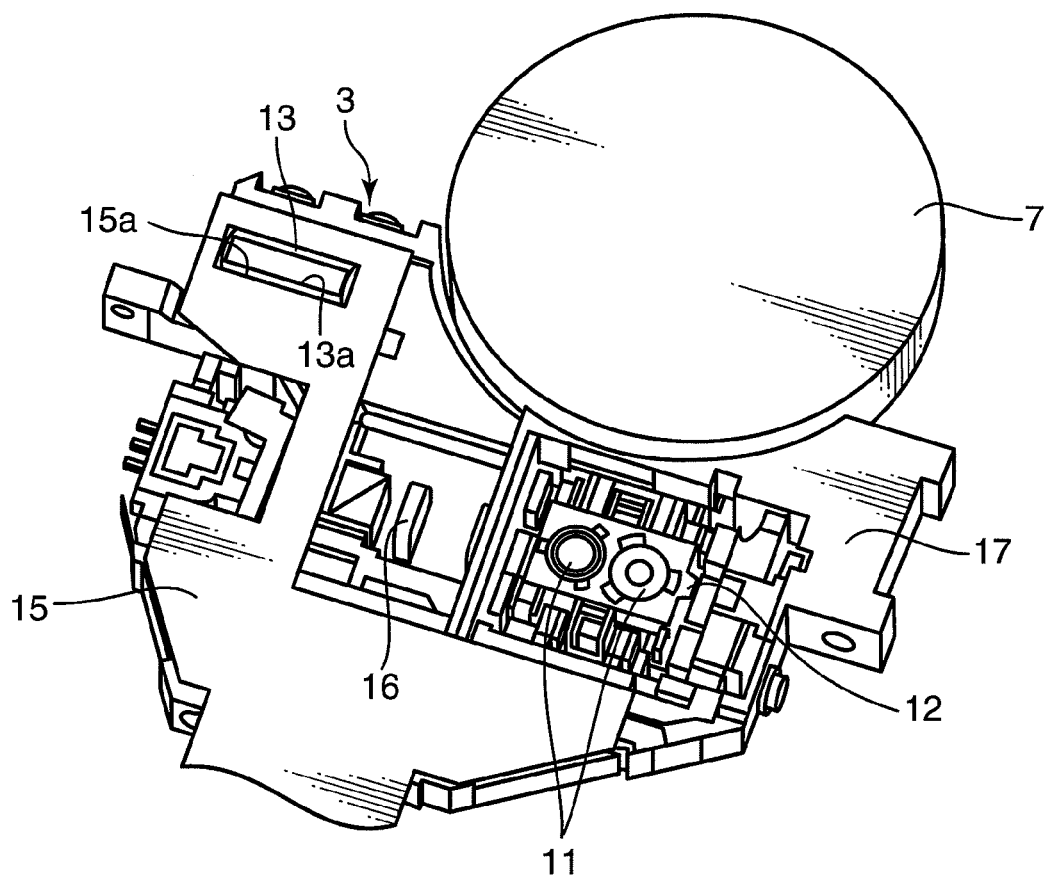
FIG. 3 is a perspective view showing a state where a head cover is removed from the optical head shown in FIG. 2.

Hereinafter, each embodiment of the invention will be described with reference to the drawings. FIG. 1 is a perspective view showing the configuration of an optical disk recording/reproducing device according to a first embodiment of the invention. FIG. 2 is a perspective view showing the configuration of an optical head shown in FIG. 1. FIG. 3 is a perspective view showing a state where a head cover is removed from the optical head shown in FIG. 2. For ease of illustration, a drive base to hold a drive cover 2, a mechanical base 5, and the like, a full case to cover the entire drive, and so forth are omitted in FIG. 1.

An optical disk recording/reproducing device 1 shown in FIG. 1 includes a drive cover 2, an optical head 3, a pair of guide shafts 4, a mechanical base 5, a feed motor 6, a turntable 7, and a flexible substrate 8. As are shown in FIG. 2 and FIG. 3, the optical head 3 includes two types of objective lenses 11, an objective lens actuator 12, a stepping motor 13, a head cover 14, a flexible substrate 15, a collimator lens 16, and a head base 17.

As is shown in FIG. 1, both ends of a pair of the guide shafts 4 are fixed to the mechanical base 5, and the guide shafts 4 support the optical head 3 in a state where it is movable in a radial direction of an optical disk. The feed motor 6 is attached to the mechanical base 5 and moves the optical head 3 in the radial direction of an optical disk using a conversion mechanism that converts rotational motions into linear, such as a rack-and-pinion.

The turntable 7 is of a circular shape and held by the mechanical base 5 in a rotatable manner. It is rotated by a DD motor (not shown) or the like disposed beneath and rotates an optical disk in a predetermined direction. One end of the flexible substrate 8 is fixed to the optical head 3 as the flexible substrate 15 and supplies the optical head 3 with various signals, power, and so forth used to control the operations thereof.

The drive cover 2 is formed of a resin or sheet metal member or the like provided with two openings 2a and 2b and fixed to the mechanical base 5. The opening 2a is a long hole of an oblong shape having a long side along a direction parallel to the radial direction of an optical disk chucked on the turntable 7 (a direction parallel to a movement direction of the optical head 3) and is of a size large enough for an opening 13a of the stepping motor 13 to be exposed across a full movable range of the optical head 3. The opening 2b is an opening formed by integrating a circular opening through which the turntable 7 is exposed for loading and unloading an optical disk and an oblong opening through which at least the objective lenses 11 can be exposed when the optical head 3 is moved in the radial direction of an optical disk. It should be noted that the shape of the opening 2a is not particularly limited to the shape of the example specified above and various shapes, such as an elliptical shape and an oblong shape having round corners, can be adopted as well. It is also possible to provide two or more openings 2a.

A wall surface 5a is formed in one end portion of the mechanical base 5 and a notch portion 5b of a rectangular shape is provided to the wall surface 5a. An air flow described below is therefore discharged smoothly to the outside of the mechanical base 5 via the notch portion 5b. It should be noted that the shape of the notch portion 5b is not particularly limited to the shape of the example specified above and various shapes can be adopted as well. Alternatively, a hole of a rectangular shape or the like can be provided instead of the notch portion.

As are shown in FIG. 2 and FIG. 3, the objective lens actuator 12 is attached to the head base 17, and formed of an objective lens holder to hold the two types of objective lenses 11, a suspension to support the objective lens holder in a movable manner, and a magnetic circuit, a focus coil, and a tracking coil to move the objective lens holder, as well as an actuator base to hold the magnetic circuit and the like.

The objective lens actuator 12 drives one objective lens from the two types of objective lenses 11 in a focus direction (a direction substantially perpendicular to the recording surface of an optical disk) and a tracking direction (a direction substantially perpendicular to the recording tracks of an optical disk) with respect to the recording tracks of an optical disk by applying a predetermined drive current to the focus coil and the tracking coil and forms a predetermined light spot on the optical disk. Information is recorded into an optical disk and/or information is reproduced from an optical disk using this light spot.

As is shown in FIG. 2, the head cover 14 is fixed to the head base 17 and covers the top surface of the optical head 3. The head cover 14 is formed of a plate metal member or the like and provided with two openings 14a and 14b. The opening 14a is a long hole of an oblong shape having a long side along a direction parallel to the radial direction of an optical disk chucked on the turntable 7 (a direction (tangential direction) orthogonal to a movement direction of the optical head 3 (radial direction)). Through the opening 14b, the top surface of the objective lens actuator 12 is exposed. It should be noted that the shape of the opening 14a is not particularly limited to the shape of the example specified above and various shapes, such as an elliptical shape and an oblong shape having round corners, can be adopted as well. It is also possible to provide two or more openings 14a. Alternatively, in a case were a region of the opening 14a can be exposed, the opening 14a may be omitted. The shape of the head cover 14 is not particularly limited to the shape of the example specified above, either, and various modifications are possible by omitting the head cover itself or providing the head cover to the back surface of the optical head 3 alone.

As is shown in FIG. 3, the flexible substrate 15 is fixed to the head base 17 and covers a predetermined portion of the top surface of the optical head 3. The flexible substrate 15 is provided with a plurality of wirings used to supply predetermined signals and power and an opening 15a. The opening 15a is a long hole of an oblong shape having a long side along a direction parallel to the radial direction of an optical disk chucked on the turntable 7 (a direction orthogonal to the movement direction of the optical head 3) and is of the same shape as the opening 14a. It should be noted that the shape of the opening 15a is not particularly limited to the shape of the example specified above and various shapes, such as an elliptical shape and an oblong shape having round corners, can be adopted as well. It is also possible to provide two or more openings 15a. In a case where the region of the opening 15a can be exposed, the opening 15a may be omitted. The shape of the flexible substrate 15 is not particularly limited to the shape of the example specified above, either, and various modifications are possible by omitting the flexible substrate itself or providing the flexible substrate to the back surface of the optical head 3 alone. Further, either a single-layer or multi-layer (for example, double- or triple-layer) flexible substrate can be used as the flexible substrate 15.

The stepping motor 13 is attached to the head base 17 and drives the collimator lens 16. The stepping motor 13 is provided with the opening 13a at the position corresponding to the opening 14a and the opening 15a and the opening 13a is of the same shape as the opening 14a and the opening 15a. It should be noted that the shape of the opening 13a is not particularly limited to the shape of the example specified above and various shapes, such as an elliptical shape and an oblong shape with round corners, can be adopted as well. It is also possible to provide two or more openings 13a.

FIG. 2 shows a state where the optical head 3 is at the innermost peripheral position with respect to an optical disk. The opening 13a of the stepping motor 13 is a long hole formed along the major axis direction of the stepping motor 13. When the optical head 3 is at the innermost peripheral position with respect to an optical disk, the opening 13a is disposed on the inner peripheral side of an optical disk from a straight line (a tangential line in a tangential direction to an outer peripheral circle of the turntable 7) TL that is tangent to the outer peripheral circle of the turntable 7 and orthogonal to the movement direction MD of the optical head 3, in other words, at the position diagonally upward left on the optical head 3. In this case, by air-cooling the stator and the rotor sufficiently with an air flow induced by rotations of an optical disk via the opening 13a formed along the major axis direction of the stepping motor 13, it becomes possible to sufficiently release heat generated from the stepping motor 13. In addition, when the optical head 3 is at the innermost peripheral position with respect to an optical disk, the opening 13a, that is, the stepping motor 13 is positioned on the inner peripheral side of an optical disk from the straight line TL. Accordingly, the objective lenses 11 can be disposed in the closest proximity to the turntable 7 and the stepping motor 13 can be disposed in a remaining space after optical components, such as the objective lenses 11, are disposed. The optical head 3 can be therefore further smaller.

Figure 4:
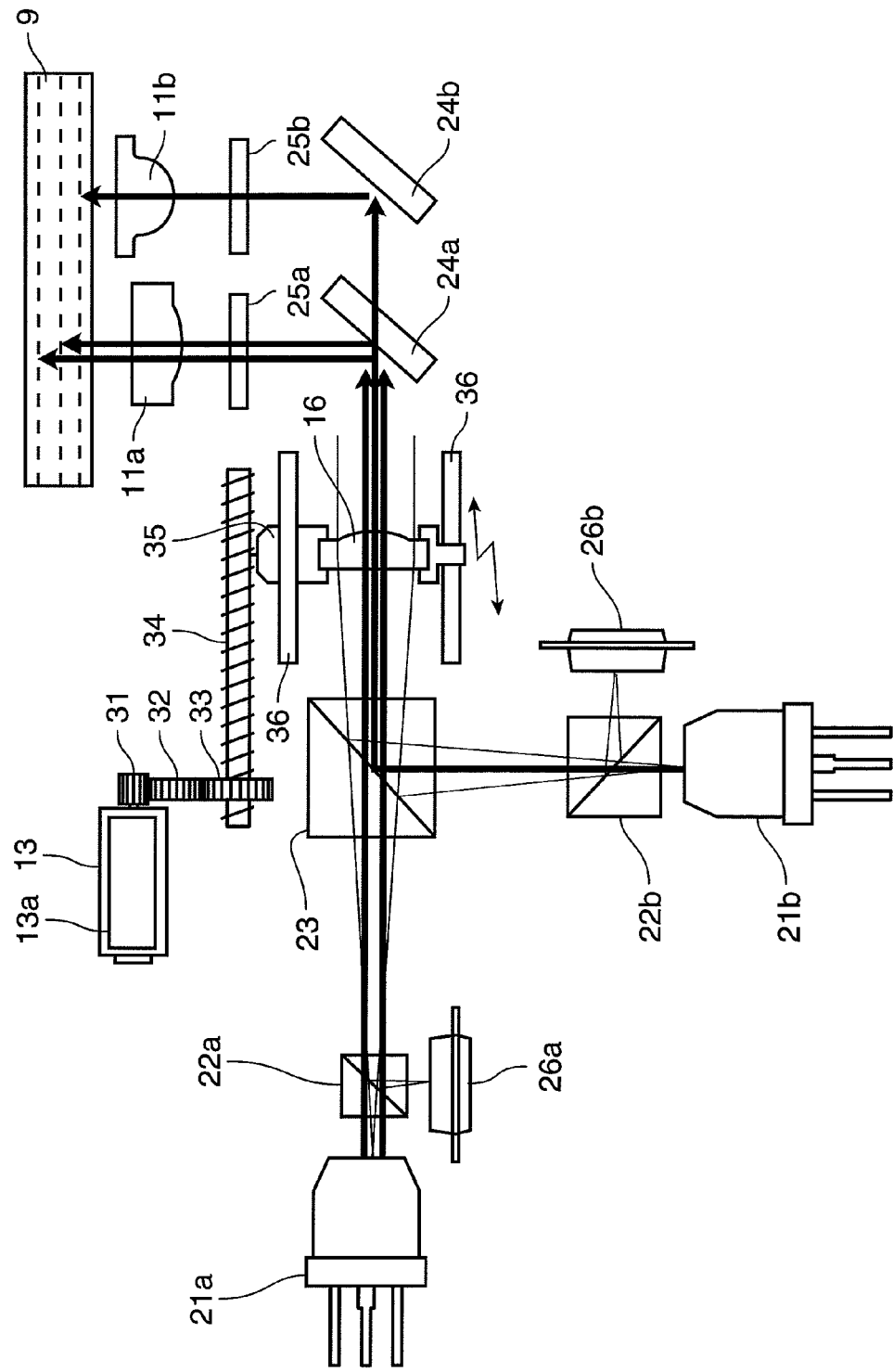
FIG. 4 is a schematic view showing the configuration of an optical system of the optical head shown in FIG. 1 through FIG. 3.
Figure 5:
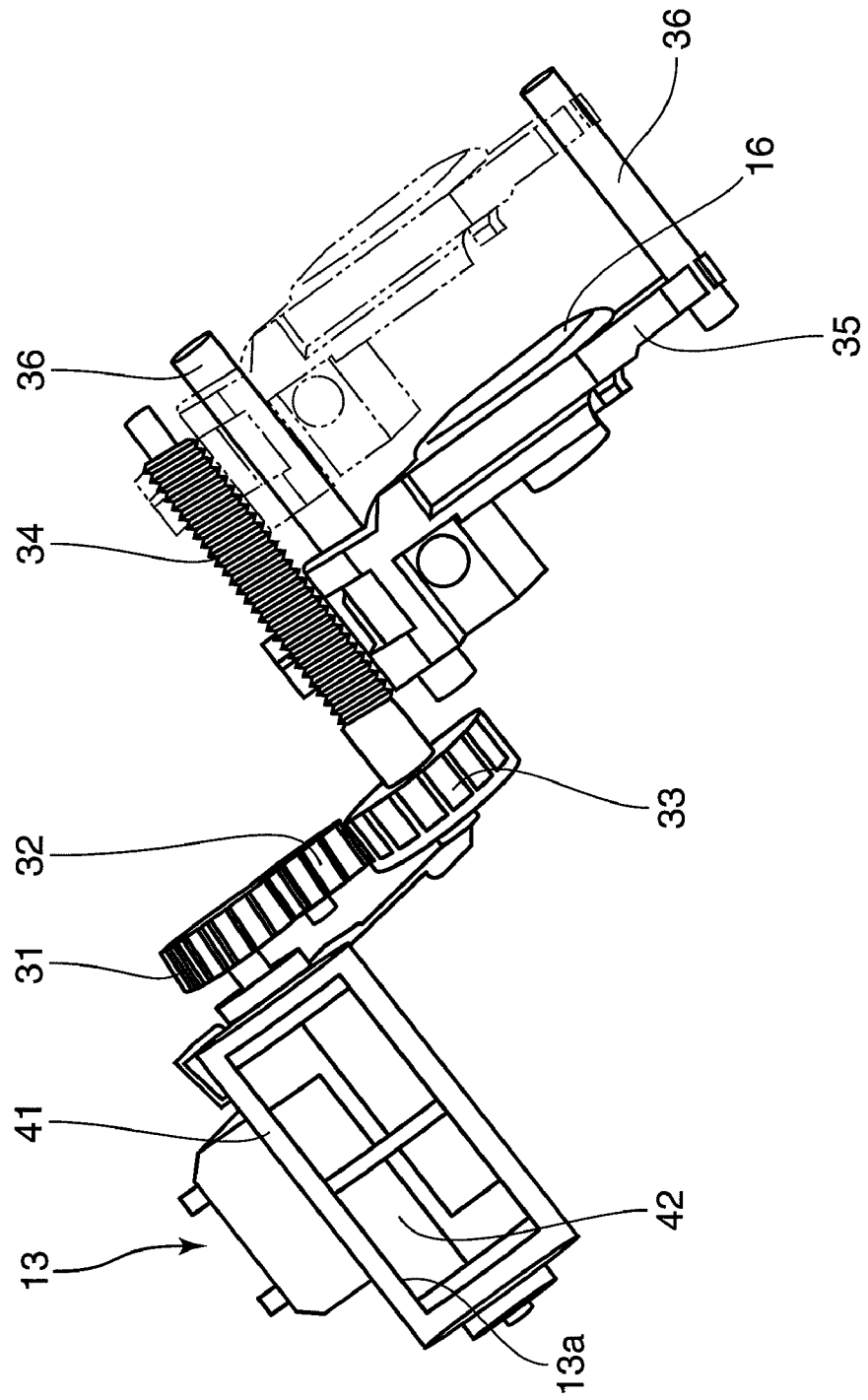
FIG. 5 is a perspective view showing the configuration of a spherical aberration correction mechanism shown in FIG. 4.

FIG. 4 is a schematic view showing the configuration of an optical system of the optical head shown in FIG. 1 through FIG. 3. FIG. 5 is a perspective view showing the configuration of a spherical aberration correction mechanism shown in FIG. 4. The optical head 3 shown in FIG. 4 includes objective lenses 11a and 11b (the objective lenses 11 shown in FIG. 1 and relevant drawings), the stepping motor 13, semiconductor lasers 21a and 21b, polarized beam splitters 22a, 22b, and 23, a collimator lens 16, rising mirrors 24a and 24b, wave plates 25a and 25b, photo-detectors 26a and 26b, three gears 31 through 33, a drive shaft 34, a rack portion 35, and a pair of guide shafts 36. The stepping motor 13, the three gears 31 through 33, the drive shaft 34, the rack portion 35, and a pair of the guide shafts 36 together form the spherical aberration correction mechanism.

In this embodiment, a BD with a protection layer (light transmitting layer) having a thickness of about 0.1 mm, a DVD with a protection layer having a thickness of about 0.6 mm, and a CD with a protection layer having a thickness of about 1.2 mm are used as an optical disk 9, and the optical head 3 records/reproduces information into/from these three types of optical disks in the following manners.

Initially, as is shown in FIG. 4, for a CD or a DVD, the semiconductor laser 21a emits one of laser beams having two wavelengths (660 nm and 780 nm), and the polarized beam splitters 22a and 23 transmit the laser beam from the semiconductor laser 21a so as to guide the laser beam to the collimator lens 16. The collimator lens 16 converts the laser beam from the polarized beam splitter 23 into parallel light so as to guide the light beam to the rising mirror 24a. In this instance, the stepping motor 13 adjusts the position of the collimator lens 16 according to the thickness of the protection layer of a CD or a DVD and spherical aberration is corrected.

To be more concrete, as is shown in FIG. 5, the stepping motor 13 rotates the drive shaft 34 by sequentially rotating the three gears 31 through 33. The drive shaft 34 is provided with a screw portion and the rack portion 35 engages with the screw portion. Rotational motions of the drive shaft 34 are thus converted into linear motions of the rack portion 35. The collimator lens 16 is held by the rack portion 35 and the rack portion 35 is supported on the guide shafts 36 in a movable manner. Accordingly, the collimator lens 16 is moved in association with movements of the rack portion 35 and the position of the collimator lens 16 is adjusted according to the thickness of the protection layer of the optical disk 9, so that spherical aberration resulting from a difference and a variance in thickness of the protection layer can be corrected. In FIG. 5, the position of the collimator lens 16 indicated by a solid line is the position at which the collimator lens 16 is moved on the polarized beam splitter 23 side to the closest extent possible and the position of the collimator lens 16 indicated by an alternate long and short dashed line is the position at which the collimator lens 16 is moved on the rising mirror 24a side to the closest extent possible.

Referring to FIG. 4 again, the rising mirror 24a reflects a laser beam having a wavelength of 660 nm or 780 nm so as to guide the laser beam to the objective lens 11a via the wave plate 25a. The objective lens 11a is an objective lens having an NA of 0.65 corresponding to a DVD or a CD and forms a predetermined light spot on the recording surface of the optical disk 9. The light beam reflected on the recording surface of the optical disk 9 is guided to the rising mirror 24a via the wave plate 25a. The rising mirror 24a reflects a laser beam having a wavelength of 660 nm or 780 nm so as to guide the laser beam to the polarized beam splitter 22a via the collimator lens 16 and the polarization beam splitter 23. The polarization beam splitter 22a reflects a laser beam having a wavelength of 660 nm or 780 nm so as to guide the laser beam to the photo-detector 26a. The photo-detector 26a detects reflected light having a wavelength of 660 nm or 780 nm.

For a BD, the semiconductor laser 21b emits a laser beam having a wavelength of 405 nm and the polarized beam splitter 22b transmits the laser beam from the semiconductor laser 21b so as to guide the laser beam to the polarized beam splitter 23. The polarized beam splitter 23 reflects a laser beam having a wavelength of 405 nm so as to guide the laser beam to the collimator lens 16. The collimator lens 16 converts a laser beam from the polarized beam splitter 23 into parallel light so as to guide the light beam to the rising mirror 24a. In this instance, in the same manner as above, the stepping motor 13 adjusts the position of the collimator lens 16 according to the thickness of the protection layer of the BD and spherical aberration is corrected.

The rising mirror 24a transmits a laser beam having a wavelength of 405 nm whereas the rising mirror 24b reflects a laser beam having a wavelength of 405 nm so as to guide the laser beam to the objective lens 11b via the wave plate 25b. The objective lens 11b is an objective lens having an NA of 0.85 corresponding to a BD and forms a predetermined light spot on the recording surface of the optical disk 9. A light beam reflected on the recording surface of the optical disk 9 is guided to the rising mirror 24b via the wave plate 25b. The rising mirror 24b reflects a laser beam having a wavelength of 405 nm so as to guide the laser beam to the rising mirror 24a. The rising mirror 24a transmits a laser beam having a wavelength of 405 nm so as to guide the laser beam to the polarized beam splitter 23 via the collimator lens 16. The polarized beam splitters 23 and 22b reflect a laser beam having a wavelength of 405 nm so as to guide the laser beam to the photo-detector 26b. The photo-detector 26b detects reflected light having a wavelength of 405 nm.

Figure 7:
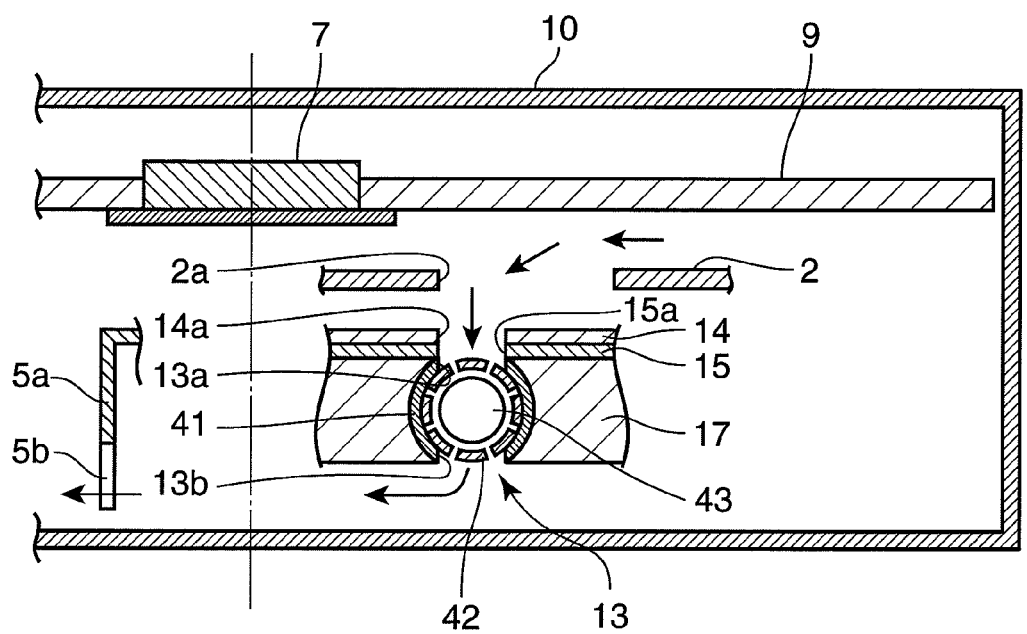
FIG. 7 is a schematic cross section used to describe the flow in a vertical direction of an air flow induced by rotations of an optical disk in the optical disk recording/reproducing device shown in FIG. 1.

Also, as is shown in FIG. 5, the stepping motor 13 includes a cover 41, a stator 42, and a rotor 43 (see FIG. 7). As with the known stepping, the operation principle of the stepping motor 13 is to dispose the stator 42, which is an electromagnet formed of comb-teeth yokes (for example, eight yokes), a bobbin, and a coil, on the periphery of the rotor 43 formed of a magnet attached to the rotation shaft, and to rotate the rotor 43 by successively switching the polarities of the comb-teeth yokes.

The cover 41 protects the stator 42 and the rotor 43 by enclosing the stator 42 and the rotor 43 therein. The cover 41 is formed of a resin or sheet metal member of a non-magnetic material and shaped like a circular tube. The cover 41 is provided with a bearing that supports the rotation shaft of the rotor 43 in a rotatable manner.

In a normal circular motor, when the exterior case is magnetized, the efficiency of the internal magnetic circuit deteriorates (part of magnetism jumps to the exterior case). In order to avoid such an inconvenience, the exterior case is made non-magnetic by forming the exterior case using a magnetic material first and thence demagnetizing the exterior case by means of annealing performed in the last instance. On the part of the stepping motor 13, a non-magnetic material (for example, material based on SUS 304) is used for the cover 41 from the start, so that it is formed not to be magnetized even when it is processed. The reason why a non-magnetic material is used for the cover 41 is as follows. That is, once the cover 41 has been processed, annealing is not applicable because the dimension varies and distortion occurs when it is annealed. In addition, because the opening 13a is provided to the cover 41, when the cover 41 is magnetized, the magnetic circuit becomes discontinuous. For these reasons, it is essential to make the cover 41 from a non-magnetic material.

The cover 41 is provided with the opening 13a at the position corresponding to the opening 14a of the head cover 14 and the opening 15a of the flexible substrate 15. The opening 13b (see FIG. 7) of the same shape as the opening 13a is provided to the cover 41 at a position on the side opposite to the optical disk, that is, on the lower side of the optical disk recording/reproducing device 1.

The opening 13a is a long hole of an oblong shape having a long side along a direction parallel to the radial direction of an optical disk chucked on the turntable 7 (a direction orthogonal to the movement direction of the optical head 3), through which a part of the top surface of the stator 42 (for example, at least a ⅙ portion on the circular tube side) is exposed. The opening 13b is a long hole of an oblong shape having a long side along a direction parallel to the radial direction of an optical disk chucked on the turntable 7 (a direction orthogonal to the movement direction of the optical head 3), through which a part of the bottom surface of the stator 42 (for example, at least a ⅙ portion on the circular tube side) is exposed.

The bobbin of the stator 42 and the rotor 43 are formed of heat conducting resin or the like. In this case, as will be described below, heat generated in the coil by the driving of the stepping motor 13 can be released efficiently to the outside of the stator 42 and the rotor 43 by an air flow that passes through from the opening 14a to the opening 14b.

It should be noted that the shape of the openings 13a and 13b is not particularly limited to the shape of the example specified above and various shapes, such as an elliptical shape and an oblong shape with round corners, can be adopted as well. It is also possible to provide two or more openings 13a and 13b. Alternatively, the cover 41 may be omitted so that the stator is used also as the cover. In this case, the stator is exposed entirely and heat generated in the coil by the driving of the stepping motor 13 can be released efficiently to the outside via the stator 42. Also, in a case where the cover is omitted, a bearing that supports the rotational shaft of the rotor 43 in a rotatable manner may be provided to the stator 42.

Further, a motor to which the invention is applicable is not particularly limited to the stepping motor described above, and various stepping motors can be used or other motors, such as a DC motor, can be used as well. Also, the optical head that records/reproduces information in/from three types of optical disks has been described as an example of the optical head 3. It should be appreciated, however, that the invention is not particularly limited to this example, and the invention can be applied as well to an optical head that records/reproduces information in/from one, two, four or more types of optical disks by omitting or adding optical components. Also, a movable member of the invention is not particularly limited to the collimator lens 16 described above, and it may be configured in such a manner so as to move another optical component or the like mounted on the optical head 3.

In this embodiment, the turntable 7 corresponds to an example of the rotation member, the optical head 3 corresponds to an example of the optical head, the semiconductor lasers 21a and 21b correspond to an example of the light source, the objective lenses 11 (11a and 11b) correspond to an example of the objective lens, the objective lens actuator 12 corresponds to an example of the objective lens actuator, the collimator lens 16 corresponds to an example of the movable member, the stepping motor 13 corresponds to an example of the drive member, the head base 17 corresponds to an example of the optical base, the rotor 43 corresponds to an example of the rotor, and the stator 42 correspond to an example of the stator. Also, the cover 41 corresponds to an example of the cover member, the openings 13a and 13b correspond to an example of the opening or the long hole, the head cover 14 corresponds to an example of the base cover member, the opening 14a corresponds to an example of the base opening, the feed motor 6 corresponds to an example of the optical head moving member, the mechanical base 5 corresponds to an example of the drive base member, the drive cover 2 corresponds to an example of the drive cover portion, and the opening 2a corresponds to an example of the drive opening.

Figure 6:
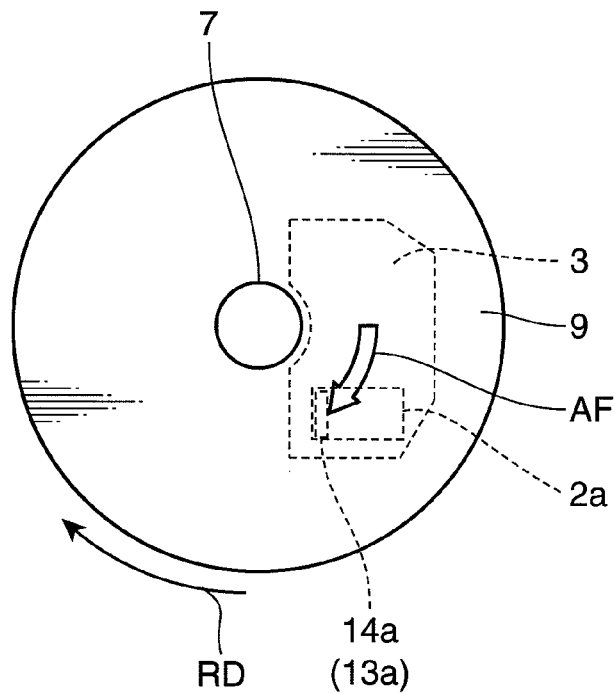
FIG. 6 is a schematic view used to describe the flow in a horizontal direction of an air flow induced by rotations of an optical disk in the optical disk recording/reproducing device shown in FIG. 1.

A heat releasing operation of the stepping motor 13 in the optical disk recording/reproducing device 1 configured as above will now be described. FIG. 6 is a schematic view used to describe the flow in a horizontal direction of an air flow induced by rotations of an optical disk in the optical disk recording/reproducing device 1 shown in FIG. 1. FIG. 7 is a schematic cross section used to describe the flow in a vertical direction of an air flow induced by rotations of an optical disk in the optical disk recording/reproducing device 1 shown in FIG. 1. The drive case 10 shown in FIG. 7 is omitted in FIG. 1, and it is a case almost in the shape of a square prism that covers the entire optical disk recording/reproducing device 1 shown in FIG. 1.

Regarding the horizontal direction of the optical disk recording/reproducing device 1, as is shown in FIG. 6, when the optical disk 9 chucked on the turntable 7 is rotated in the rotation direction (for example, in a clockwise direction) RD, an air flow AF starts to flow between the optical disk 9 and the drive cover 2 in a direction indicated by an arrow. The air flow AF is guided to the opening 14a of the head cover 14 (and the opening 15a of the flexible substrate 15) via the opening 2a of the drive cover 2 and flows into the opening 13a of the stepping motor 13.

Meanwhile, regarding the vertical direction of the optical disk recording/reproducing device 1, as is shown in FIG. 7, when the optical disk 9 chucked on the turntable 7 is rotated, an air flow flowing between the optical disk 9 and the drive cover 2 is guided to the top surface of the stepping motor 13 via the opening 2a of the drive cover 2, the opening 14a of the head cover 14, and the opening 15a of the flexible substrate 15. Herein, the opening 13a and the opening 13b are formed, respectively, in the top surface and the bottom surface of the cover 41 of the stepping motor 13 and the eight yokes of the stator 42 are disposed on the outer peripheral portion of the rotor 43 at predetermined intervals while securing predetermined clearances. Accordingly, the incoming air flow via the opening 14a of the head cover 14 and the opening 15a of the flexible substrate 15 flows into the clearances among adjacent yokes of the stator 42 and the clearance between the stator 42 and the rotor 43 and further flows between the head base 17 and the drive case 10 in a direction indicated by an arrow in the drawing after it has passed through inside the stepping motor 13 by rotations of the rotor 43. Further, the air flow flowing between the head base 17 and the drive case 10 is discharged smoothly to the outside of the mechanical base 5 via the notch portion 5b formed in the wall surface 5a.

As has been described, in this embodiment, an air flow induced by rotations of the optical disk 9 flows sequentially into the opening 2a of the drive cover 2, the opening 14a of the head cover 14, the opening 15a of the flexible substrate 15, and the opening 13a and the opening 13b of the cover 41. It is therefore possible to let air flow inside the stepping motor 13, that is, between the stator 42 and the rotor 43. Heat generated by the driving of the stepping motor 13 can be thus released efficiently. Consequently, a sufficient drive current can be supplied to the stepping motor 13 and the torque of the stepping motor 13 can be enhanced.

The air flow described above flows between the optical disk 9 and the drive cover 2 first and thence between the head base 17 and the drive case 10, that is, from the upper side to the lower side of the optical disk recording/reproducing device 1. Hence, the air flow can force foreign matter, such as dust generated or lubrication oil scattered from a sliding portion, such as a sliding contact portion between the rotation shaft and the bearing of the stepping motor 13, to migrate in a direction moving away from the optical disk 9. It thus becomes possible to record/reproduce information in/from the optical disk 9 in a stable manner.

Further, the stepping motor 13 is disposed on the head base 17 on the downwind side of the air flow with respect to optical components, such as the objective lenses 11. It is therefore possible to prevent foreign matter, such as dust generated from the stepping motor 13, from adhering to the optical components, such as the objective lens 11, which makes it possible to record/reproduce information in/from the optical disk 9 in a more stable manner.

In addition, because the opening 13a and the opening 13b are formed by respectively cutting out the top surface and the bottom surface of the cover 41 of the stepping motor 13, the optical head 3 can be made thinner by reducing the height of the stepping motor 13. It thus becomes to achieve a thinner optical disk recording/reproducing device 1.

FIG. 7 shows the stepping motor 13 in a state where the optical head 3 is positioned on the innermost peripheral side of the optical disk 9. When the optical head 3 is positioned on the outermost peripheral side of the optical disk 9, the stepping motor 13 moves rightward in the drawing and the opening 15a is positioned on the right side of the opening 2a. Accordingly, the air flow flows in the same manner as above and the effects same as above can be achieved. In addition, the rotation direction of the optical disk 9 and the rotation direction of the stepping motor 13 are not particularly limited to the directions of the example specified above, and the directions can be changed in various manners.

Figure 8:
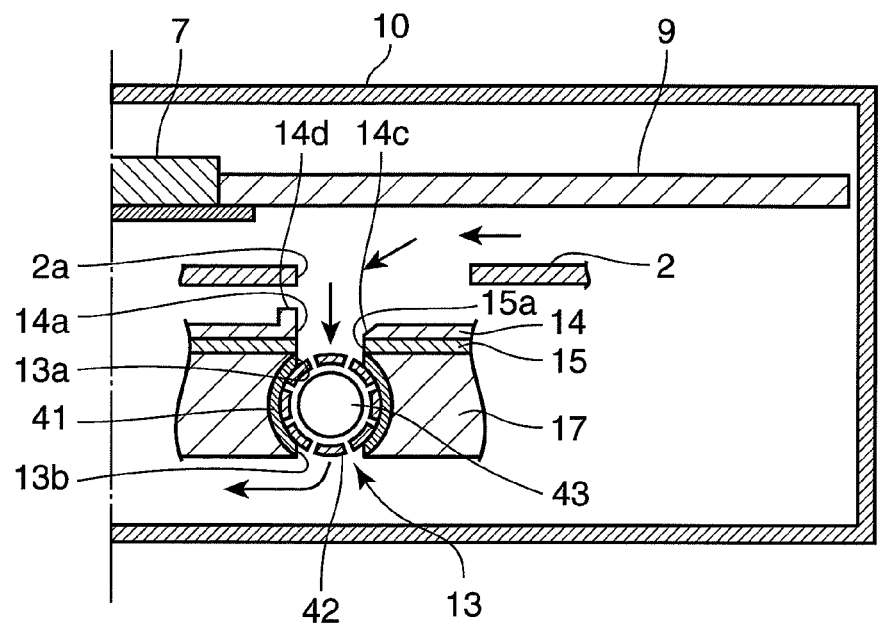
FIG. 8 is a schematic cross section showing the configuration of an opening used in the optical disk recording/reproducing device according to a second embodiment of the invention.

The optical disk recording/reproducing device according to a second embodiment of the invention will now be described. FIG. 8 is a schematic cross section showing the configuration of an opening used in the optical disk recording/reproducing device according to the second embodiment of the invention. The optical disk recording/reproducing device of the second embodiment is of the same configuration as the optical disk recording/reproducing device shown in FIG. 1 except for a portion shown in FIG. 8, and detailed illustrations and descriptions of the same portions are omitted herein.

In the optical disk recording/reproducing device shown in FIG. 8, at the windward position of an air flow induced by rotations of an optical disk on the rim of the opening 14a of the head cover 14, that is, on one side of the opening 14a positioned on the outer peripheral side of the optical disk 9, a concave portion (an inclined surface formed by C-plane machining) 14c to guide the air flow inside the stepping motor 13 is formed. At the downwind position of the air flow induced by rotations of an optical disk on the rim of the opening 14a of the head cover 14, that is, on one side of the opening 14a positioned on the side of the center of rotation of the optical disk 9, a convex portion 14d to guide the air flow inside the stepping motor 13 is formed.

In this case, the incoming air flow via the opening 2a of the drive cover 2 is guided smoothly inside the stepping motor 13 along the inclined surface of the concave portion 14c and is also guided efficiently inside the stepping motor 13 by abutting on the convex portion 14d.

As has been described, because a larger amount of air flow flows efficiently into the clearances among yokes of the stator 42 and the clearance between the stator 42 and the rotor 43 owing to the concave portion 14c and the convex portion 14d of the head cover 14 in this embodiment, in addition to the effects of the first embodiment above, it is possible to release heat generated by the driving of the stepping motor 13 more efficiently.

It should be appreciated that the concave portion and the convex portion that guide the air flow are not particularly limited to those in the example specified above, and various modifications are possible by forming a concave portion or a convex portion also on another side of the opening 14a of the head cover 14 or on the rim of the opening 2a of the drive cover 2 or by using only either one of the concave portion and the convex portion.

Figure 9:
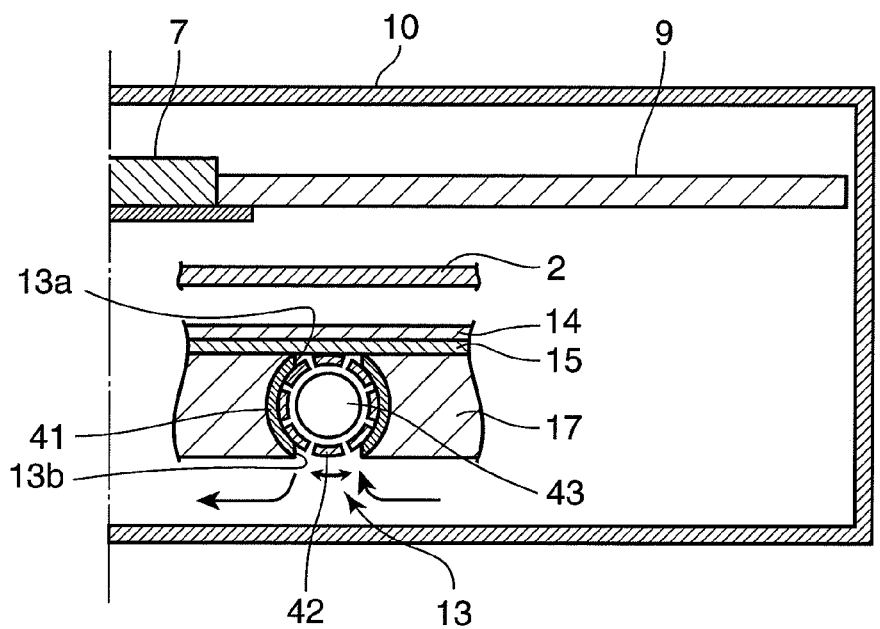
FIG. 9 is a schematic cross section showing the configuration of an opening used in the optical disk recording/reproducing device according to a third embodiment of the invention.

The optical disk recording/reproducing device according to a third embodiment of the invention will now be described. FIG. 9 is a schematic cross section showing the configuration of an opening used in the optical disk recording/reproducing device according to the third embodiment of the invention. The optical disk recording/reproducing device of the third embodiment is of the same configuration as the optical disk recording/reproducing device shown in FIG. 1 except for a portion shown in FIG. 9, and detailed illustrations and descriptions of the same portions are omitted herein.

In the optical disk recording/reproducing device shown in FIG. 9, the drive cover 2, the head cover 14, and the flexible substrate 15 do not have openings at positions opposing the opening 13a of the cover 41 and the top surface of the stepping motor 13 is closed.

In this case, an air flow induced by rotations of the optical disk 9 flows between the bottom surfaces of the stepping motor 13 and the head base 17 and the bottom surface of the drive case 10. In this instance, because the rotor 43 of the stepping motor 13 is rotating in either one of the directions indicated by a double arrow in the drawing, the air flow is sucked inside the stepping motor 13. The air flow therefore flows into the clearances among yokes of the stator 42 and the clearance between the stator 42 and the rotor 43 and is discharged to the outside of the stepping motor 13 along the direction indicated in the drawing by rotations of the rotor 43. It thus becomes possible to efficiently release heat generated by the driving of the stepping motor 13.

As has been described, because the top portion of the stepping motor 13 is closed completely by the drive cover 2, the head cover 14, and the flexible substrate 15 in this embodiment, in addition to the effects of the first embodiment above, it is possible to prevent foreign matter, such as dust generated from the stepping motor 13, from adhering to the optical disk 9 and the optical components such as the objective lenses 11, in a reliable manner, which makes it possible to record/reproduce information in/from the optical disk 9 in a more stable manner.

Figure 10:
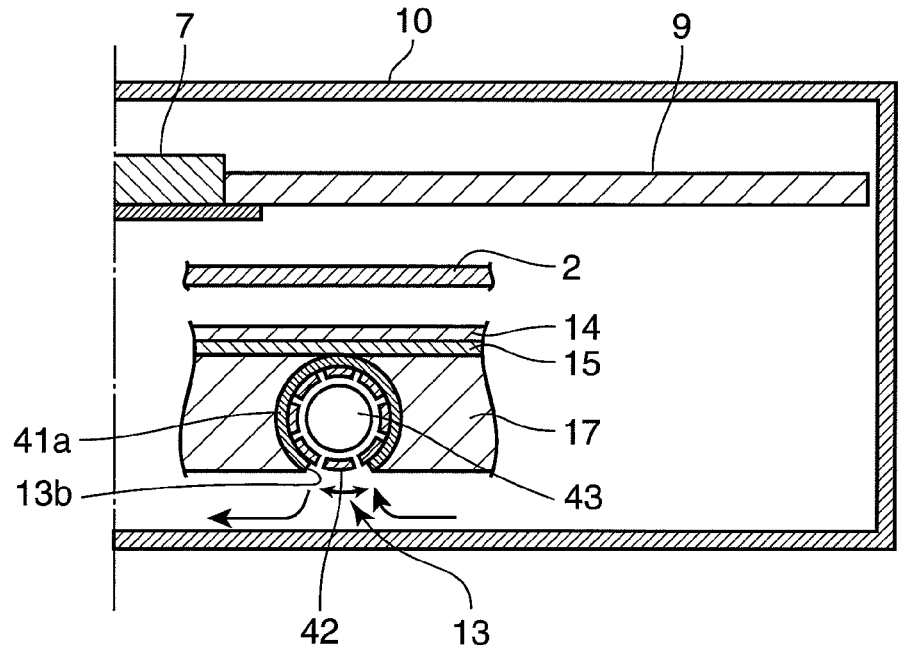
FIG. 10 is a schematic cross section showing the configuration of an opening used in the optical disk recording/reproducing device according to a fourth embodiment of the invention.

The optical disk recording/reproducing device according to a fourth embodiment of the invention will now be described. FIG. 10 is a schematic cross section showing the configuration of an opening used in the optical disk recording/reproducing device according to the fourth embodiment of the invention. The optical disk recording/reproducing device of the fourth embodiment is of the same configuration as the optical disk recording/reproducing device shown in FIG. 1 except for a portion shown in FIG. 10, and detailed illustrations and descriptions of the same portions are omitted herein.

In the optical disk recording/reproducing device shown in FIG. 10, the drive cover 2, the head cover 14, and the flexible substrate 15 do not have openings at positions opposing the top surface of the stepping motor 13 and a cover 41a of the stepping motor 13 has an opening 13b only in the bottom surface and the top surface thereof is closed.

In this case, too, an air flow induced by rotations of the optical disk 9 flows as is indicated in the drawing in the same manner as in the third embodiment above, and heat generated by the driving of the stepping motor 13 can be released efficiently. Because the top portion of the stepping motor 13 is closed completely by the drive cover 2, the head cover 14, the flexible substrate 15, and the cover 41a in this embodiment, in addition to the effects of the third embodiment above, it is possible to prevent foreign matter, such as dust generated from the stepping motor 13, from adhering to the optical disk 9 and the optical components such as the objective lenses 11 in a reliable manner, which makes it possible to record/reproduce information into/from the optical disk 9 in a more stable manner.

Figure 11:
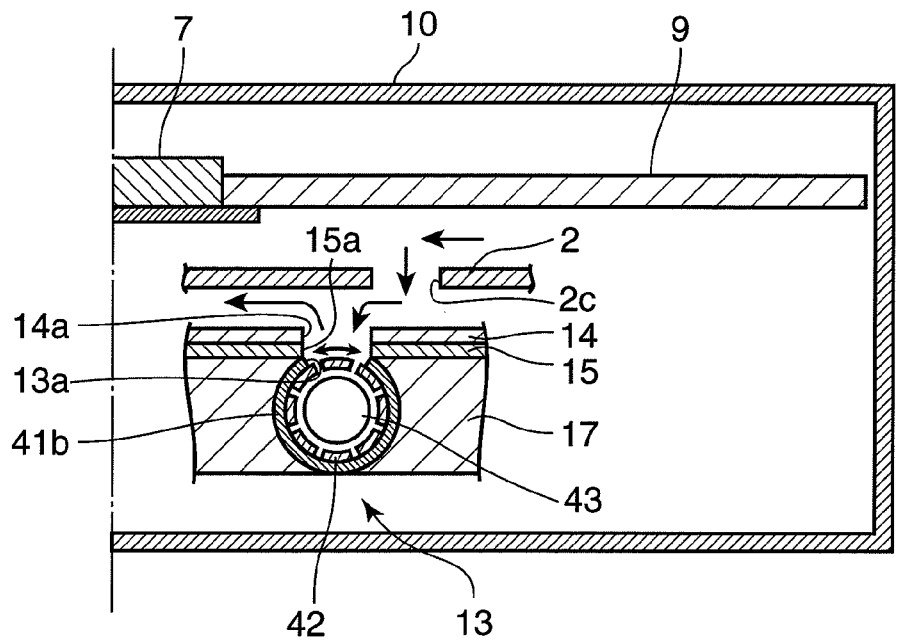
FIG. 11 is a schematic cross section showing the configuration of an opening used in the optical disk recording/reproducing device according to a fifth embodiment of the invention.

The optical disk recording/reproducing device according to a fifth embodiment of the invention will now be described. FIG. 11 is a schematic cross section showing the configuration of an opening used in the optical disk recording device according to the fifth embodiment of the invention. The optical disk recording/reproducing device of the fifth embodiment is of the same configuration as the optical disk recording/reproducing device shown in FIG. 1 except for a portion shown in FIG. 11, and detailed illustrations and descriptions of the same portions are omitted herein.

In the optical disk recording/reproducing device shown in FIG. 11, a cover 41*b* of the stepping motor 13 has the opening 13*a* in the top surface alone and the bottom surface thereof is closed. The drive cover 2 has an opening 2*c* at the position corresponding to the opening 14*a* of the head cover 14, the opening 15*a* of the flexible substrate 15, and the opening 13*a* of the cover 41*b* when the optical head 3 is at the intermediate recording position (or the intermediate reproduction position) with respect to the optical disk 9. The opening 2*c* is of the same shape as the opening 14*a*, the opening 15*a*, and the opening 13*a* and is smaller than the opening 2*a* used in the first embodiment above.

In this case, when the optical disk 9 chucked on the turntable 7 is rotated, an air flow flowing between the optical disk 9 and the drive cover 2 flows between the drive cover 2 and the head cover 14 via the opening 2*c* of the drive cover 2. In this instance, because the rotor 43 of the stepping motor 13 is rotating in either one of the directions indicated by a double arrow in the drawing, the air flow is sucked inside the stepping motor 13. The air flow therefore flows into the clearances among yokes of the stator 42 and the clearance between the stator 42 and the rotor 43 and is discharged to the outside of the stepping motor 13 along the direction indicated in the drawing by rotations of the rotor 43.

Consequently, as in the first embodiment above, heat generated by the driving of the stepping motor 13 can be released efficiently in this embodiment. In this embodiment, the opening 2*c* is provided at the intermediate recording position (or the intermediate reproduction position) of the optical head 3. It should be appreciated, however, that the position of the opening 2*c* is not particularly limited to the position in the example specified above and it can be provided to another position. Also, the opening 2*c* is of the same size as the opening 14*a*. It is, however, possible to use an opening of a different size or to provide more than one opening.

Figure 12:
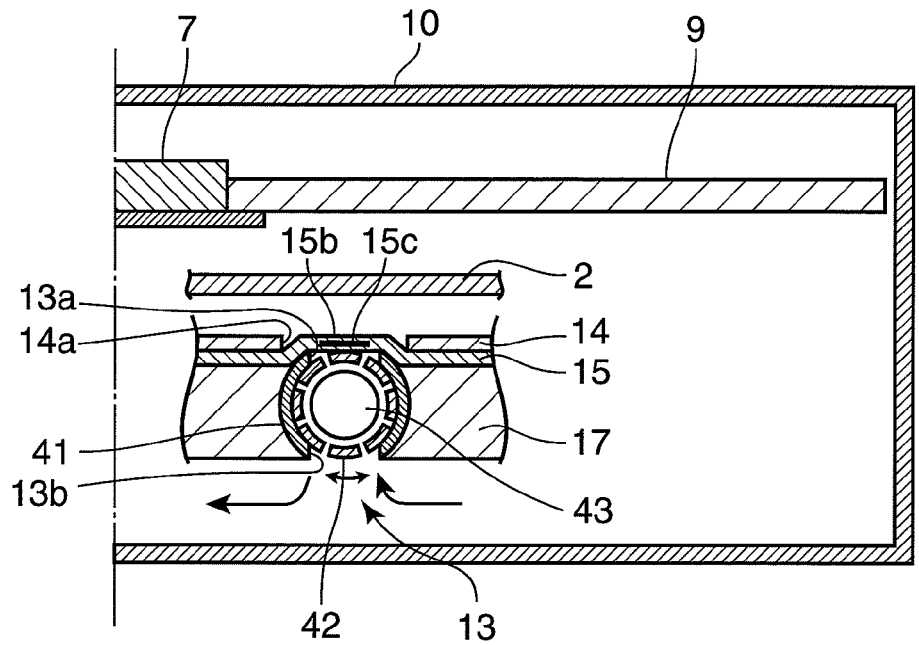
FIG. 12 is a schematic cross section showing the configuration of an opening used in the optical disk recording/reproducing device according to a sixth embodiment of the invention.

The optical disk recording/reproducing device according to a sixth embodiment of the invention will now be described. FIG. 12 is a schematic cross section showing the configuration of an opening used in the optical disk recording/reproducing device according to the sixth embodiment of the invention. The optical disk recording/reproducing device of the sixth embodiment is of the same configuration as the optical disk recording/reproducing device shown in FIG. 1 except for a portion shown in FIG. 12, and detailed illustrations and descriptions of the same portions are omitted herein.

In the optical disk recording/reproducing device shown in FIG. 12, the drive cover 2 and the flexible substrate 15 do not have openings at positions opposing the opening 13*a* of the cover 41 whereas the head cover 14 has an opening 14*a*. However, a curved portion (convex portion) 15*b* of the flexible substrate 15 is located at the position of the opening 14*a* and the opening 14*a* is closed by the curved portion 15*b*. The top surface of the stepping motor 13 is thus closed.

In this case, an air flow induced by rotations of the optical disk 9 flows between the bottom surfaces of the stepping motor 13 and the head base 17 and the bottom surface of the drive case 10. In this instance, because the rotor 43 of the stepping motor 13 is rotating in either one of the directions indicated by a double arrow in the drawing, the air flow is sucked inside the stepping motor 13. The air flow therefore flows into the clearances among yokes of the stator 42 and the clearance between the stator 42 and the rotor 43 and is discharged to the outside of the stepping motor 13 along the direction indicated in the drawing by rotations of the rotor 43. It thus becomes possible to efficiently release heat generated by the driving of the stepping motor 13.

In addition, because only the curved portion 15*b* of the flexible substrate 15 is positioned above the stator 42 of the stepping motor 13, the optical head 3 can be made thinner by reducing the height from the top portion of the curved portion 15*b* of the flexible substrate 15 to the bottom portion of the stepping motor 13. It thus becomes possible to achieve a thinner optical disk recording/reproducing device 1.

Further, a wiring 15*c* to transmit signals or the like is enclosed in the curved portion 15*b*. A portion enclosing wirings normally becomes thicker than a portion that does not enclose wirings. In this embodiment, however, because the curved portion 15*b* enclosing the wiring 15*c* is disposed in the opening 14*a* of the head cover 14, the curved portion 15*b* can be as thick as the head cover 14. Accordingly, even when the flexible substrate 15 having a multi-layer wiring (for example, double- or triple-layer) is used, the optical head 3 can be made thinner by reducing the height from the top portion of the curved portion 15*b* of the flexible substrate 15 to the bottom portion of the stepping motor 13. It thus becomes possible to achieve a thinner optical disk recording/reproducing device 1.

As has been described, because the top portion of the stepping motor 13 is closed completely by the drive cover 2 and the flexible substrate 15 in this embodiment, in addition to the effects of the first embodiment above, it is possible to prevent foreign matter, such as dust generated from the stepping motor 13, from adhering to the optical disk 9 and the optical components such as the objective lenses 11, in a reliable manner, which makes it possible to record/reproduce information in/from the optical disk 9 in a more stable manner. In addition, the optical head 3 can be made thinner by reducing the height from the top portion of the curved portion 15*b* of the flexible substrate 15 to the bottom portion of the stepping motor 13. It thus becomes possible to achieve a thinner optical disk recording/reproducing device 1.

Figure 13:
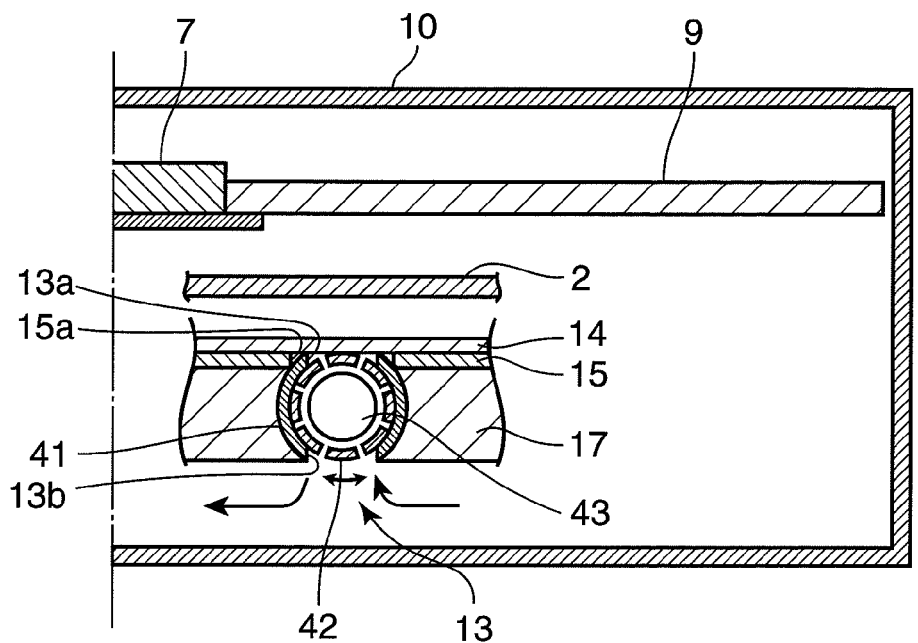
FIG. 13 is a schematic cross section showing the configuration of an opening used in the optical disk recording/reproducing device according to a seventh embodiment of the invention.
Figure 14:
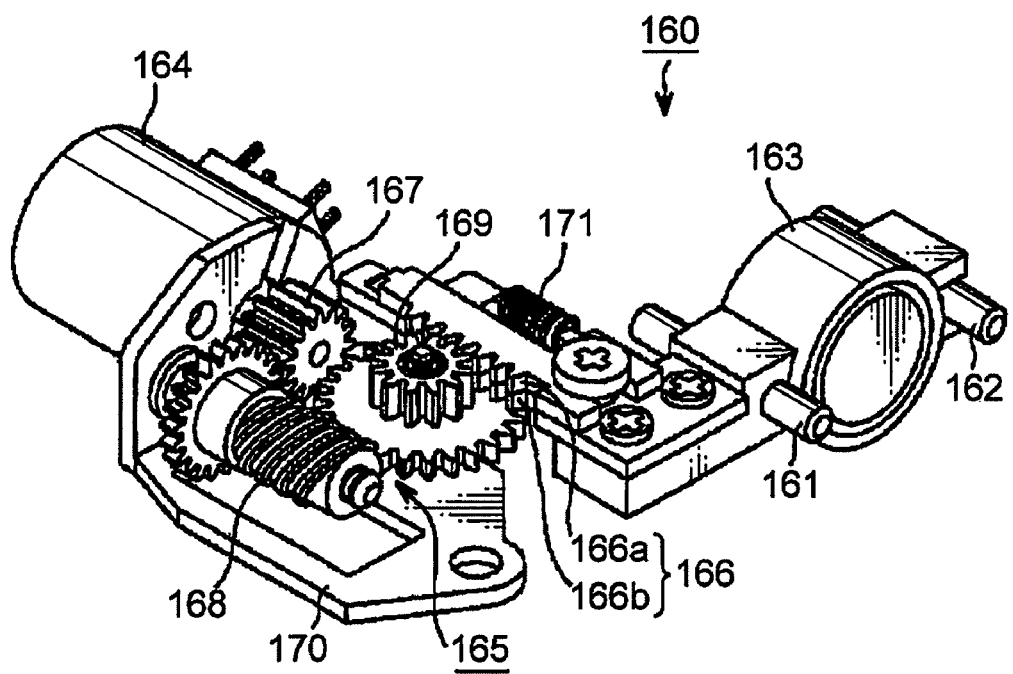
FIG. 14 is a perspective view showing the configuration of a collimator lens drive mechanism used in a conventional optical disk recording/reproducing device.

The optical disk recording/reproducing device according to a seventh embodiment of the invention will now be described. FIG. 13 is a schematic cross section showing the configuration of an opening used in the optical disk recording/reproducing device according to the seventh embodiment of the invention. The optical disk recording/reproducing device of the seventh embodiment is of the same configuration as the optical disk recording/reproducing device shown in FIG. 1 except for a portion shown in FIG. 13, and detailed illustrations and descriptions of the same portions are omitted herein.

In the optical disk recording/reproducing device shown in FIG. 13, the flexible substrate 15 has the opening 15*a*. However, because the drive cover 2 and the head cover 14 do not have openings at positions opposing the opening 13*a* of the cover 41, the top surface of the stepping motor 13 is closed.

In this case, an air flow induced by rotations of the optical disk 9 flows between the bottom surfaces of the stepping motor 13 and the head base 17 and the bottom surface of the drive case 10. In this instance, because the rotor 43 of the stepping motor 13 is rotating in either one of the directions indicated by a double arrow in the drawing, the air flow is sucked inside the stepping motor 13. Accordingly, the air flow flows into the clearances among yokes of the stator 42 and the clearance between the stator 42 and the rotor 43 and is discharged to the outside of the stepping motor 13 along the direction indicated in the drawing by rotations of the rotor 43. It thus becomes possible to efficiently release heat generated by the driving of the stepping motor 13.

In addition, the upper end portions of the cover 41 and the stator 42 are positioned at the position of the opening 15a of the flexible substrate 15 and the head cover 14 alone is positioned above the stator 42 of the stepping motor 13. Accordingly, the optical head 3 can be made thinner by reducing the height from the top portion of the head cover 14 to the bottom portion of the stepping motor 13. It thus becomes possible to achieve a thinner optical disk recording/reproducing device 1.

As has been described, because the top portion of the stepping motor 13 is closed completely by the drive cover 2 and the head cover 14 in this embodiment, in addition to the effects of the first embodiment above, it is possible to prevent foreign matter, such as dust generated from the stepping motor 13, from adhering to the optical disk 9 and the optical components such as the objective lenses 11, in a reliable manner, which makes it possible to record/reproduce information in/from the optical disk 9 in a more stable manner. In addition, the optical head 3 can be made thinner by reducing the height from the top portion of the head cover 14 to the bottom portion of the stepping motor 13. It thus becomes possible to achieve a thinner optical disk recording/reproducing device 1.

From the respective embodiments described above, the invention can be summarized as follows. That is, an optical disk recording/reproducing device according to one aspect of the invention includes a rotation member configured to rotate an optical disk, and an optical head configured to record information in and/or reproduce information from the optical disk. The optical head includes: a light source that emits light; an objective lens that collects the light emitted from the light source on the optical disk; an objective lens actuator that drives the objective lens in a focus direction and a tracking direction of the optical disk; a movable member that is disposed in an optical path between the light source and the objective lens; a drive member that drives the movable member; and an optical base on which the light source, the objective lens actuator, the movable member, and the drive member are mounted. The drive member includes a rotor and a stator and at least a part of the stator is exposed.

In this optical disk recording/reproducing device, because an optical disk is rotated with respect to the optical head that records information in and/or reproduces information from the optical disk, an air flow develops around the optical head. Herein, the light source, the objective lens actuator, the movable member, and the drive member are mounted on the optical base of the optical head and at least a part of the stator of the drive member is exposed. It is therefore possible to sufficiently release heat generated from the drive member with the air flow. In addition, because an air flow induced by rotations of the optical disk develops due to the viscosity of the optical disk and air, the contact portion between the optical disk and air is the upper stream of the air flow and the air flow sequentially flows in a direction moving away from the optical disk. Accordingly, foreign matter, such as dust generated from the drive member, is discharged in the direction moving away from the optical disk also along the flow of the air flow. It thus becomes possible to prevent adverse effects of foreign matter, such as dust generated from the drive member. Further, because at least a part of the stator of the drive member is exposed, members that are otherwise disposed in the exposed portion can be omitted. It is therefore possible to make the optical head thinner by making the drive member smaller, which makes it possible to make the optical disk recording/reproducing device thinner.

It is preferable that the drive member includes a cover member that encloses the rotor and the stator, and that the cover member has an opening through which at least the part of the stator is exposed.

In this case, the stator and the rotor are air-cooled by an air flow induced by rotations of the optical disk via the opening in the cover member. Heat generated from the drive member can be therefore released sufficiently. In addition, because the cover member can be smaller by an amount comparable to the opening, the optical disk recording/reproducing device can be made thinner.

It is preferable that the opening includes a long hole formed along a direction almost parallel to a radial direction of the optical disk.

In this case, an air flow induced by rotations of the optical disk is supplied to the drive member sufficiently via the long hole formed along the direction almost parallel to the radial direction of the optical disk. It is therefore possible to sufficiently release heat generated from the drive member.

It is preferable that the long hole is provided to the cover member at a position opposing the optical disk.

In this case, because the long hole is provided to the cover member at a position opposing the optical disk, an air flow induced by rotations of the optical disk can be supplied directly to the drive member. It is therefore possible to sufficiently release heat generated from the drive member.

It is preferable that the long hole includes a first long hole provided to the cover member at a position opposing the optical disk, and a second long hole provided to the cover member at a position on a side opposite to the optical disk.

In this case, an air flow induced by rotations of the optical disk is directly supplied to the drive member via the first long hole first and thence discharged in a direction moving away from the optical disk via the second long hole. Hence, not only is it possible to supply the air flow induced by rotations of the optical disk efficiently to the drive member, but it is also possible to prevent adverse effects of foreign matter, such as dust generated from the drive member, in a more reliable manner.

It is preferable that the long hole is provided to the cover member at a position on a side opposite to the optical disk.

In this case, because the long hole is provided to the cover member at a position on a side opposite to the optical disk, it is possible to prevent the air flow discharged from the drive member from directly flowing between the optical disk and the optical head. It thus becomes possible to prevent adverse effects of foreign matter, such as dust generated from the drive member, in a more reliable manner.

It is preferable that the cover member is made of a non-magnetic material.

In this case, annealing to demagnetize the cover member is no longer necessary. Hence, not only is it possible to suppress a variance in dimension and the occurrence of distortion, but it is also possible to prevent the magnetic circuit from becoming discontinuous even when the opening is formed in the cover member, which can enhance torque of the drive member by improving the efficiency of the magnetic circuit.

It is preferable that: the opening includes a long hole formed along a major axis direction of the drive member; the rotation member includes a turntable of a circular shape on which the optical disk is loaded; and the long hole, when the optical head is at an innermost peripheral position with respect to the optical disk, is positioned on an inner peripheral side of the optical disk from a straight line that is tangent to an outer rim of the turntable and orthogonal to a movement direction of the optical head.

In this case, the stator and the rotor are air-cooled sufficiently by an air flow induced by rotations of the optical disk via the long hole formed along the major axis direction of the drive member. Heat generated from the drive member can be therefore released sufficiently. In addition, when the optical head is at the innermost peripheral position with respect to the optical disk, the long hole, that is, the drive member is positioned on the inner peripheral side of the optical disk from a straight line that is tangent to the outer rim of the turntable and orthogonal to the movement direction of the optical head, it is possible to dispose the objective lens in the closest proximity to the turntable and to dispose the drive member in a remaining space after the optical components, such as the objective lens, are disposed. The optical head can be therefore further smaller.

It is preferable that the optical disk recording/reproducing device further includes a base cover member that is fixed to the optical base and covers at least a part of the optical base, and the base cover member has a base opening provided at a position corresponding to the opening of the cover member.

In this case, by covering the optical components, such as the light source disposed on the optical base, with the base cover member, not only is it possible to prevent foreign matter, such as dust generated by rotations of the optical disk, from adhering to the optical components, such as the light source, but it is also possible to guide an air flow induced by rotations of the optical disk smoothly to the drive member via the base opening. Heat generated from the drive member can be thus released sufficiently.

It is preferable that the base cover member has a concave portion to guide an air flow induced by rotations of the optical disk inside the drive member at a windward position of the air flow on a rim of the base opening.

In this case, because an air flow induced by rotations of the optical disk is guided smoothly inside the drive member along the concave portion of the base opening, it is possible to sufficiently release heat generated from the drive member.

It is preferable that the base cover member has a convex portion to guide an air flow induced by rotations of the optical disk inside the drive member at a downwind position of the air flow on a rim of the base opening.

In this case, because an air flow induced by rotations of the optical disk is guided efficiently inside the drive member by abutting on the concave portion of the base opening, it is possible to sufficiently release heat generated from the drive member.

It is preferable that the optical disk recording/reproducing device further includes: an optical head movement member configured to move the optical head in a radial direction of the optical disk; a drive base member configured to hold the optical head, the rotation member, and the optical head movement member; and a drive cover member configured to cover at least a part of the optical head, the optical head movement member, and the drive base member, and that the drive cover member has a drive opening provided at a position opposing the opening of the cover member.

In this case, by covering the optical head, the optical head movement member, the drive base member, and so forth with the drive base member, not only is it possible to prevent foreign matter, such as dust generated by rotations of the optical disk, from adhering to the optical components or the like forming the optical head, but it is also possible to guide an air flow induced by rotations of the optical disk smoothly to the drive member via the drive opening. Heat generated from the drive member can be thus released sufficiently.

It is preferable that the drive member is disposed on the optical base at a downwind position of an air flow induced by rotations of the optical disk.

In this case, because the drive member is disposed on the optical base on the downwind side of an air flow induced by rotations of the optical disk, it is possible to dispose the optical components, such as the objective lens, at the windward position of the air flow. It thus becomes possible to prevent foreign matter, such as dust generated from the drive member, from adhering to the optical components, such as the objective lens, which makes it possible to record information in and/or reproduce information from the optical disk in a more stable manner.

It is preferable that the movable member includes a collimator lens to correct spherical aberration of the optical head.

In this case, it is highly likely that the drive member that drives the collimator lens is driven constantly for correcting the spherical aberration of the optical head and the heat release value is increased. It is, however, possible to sufficiently release heat generated from the drive member with an air flow induced by rotations of the optical disk.

An optical head according to another aspect of the invention includes: a light source that emits light; an objective lens that collects the light emitted from the light source on an optical disk; an objective lens actuator that drives the objective lens in a focus direction and a tracking direction of the optical disk; a movable member that is disposed in an optical path between the light source and the objective lens; a drive member that drives the movable member; and an optical base on which the light source, the objective lens actuator, the movable member, and the drive member are mounted. The drive member includes a rotor and a stator and at least a part of the stator is exposed.

In this optical head, because an optical disk is rotated with respect to the optical head, an air flow develops around the optical head. Herein, the light source, the objective lens actuator, the movable member, and the drive member are mounted on the optical base of the optical head and at least a part of the stator of the drive member is exposed. It is therefore possible to sufficiently release heat generated from the drive member with the air flow. In addition, because an air flow induced by rotations of the optical disk develops due to the viscosity of the optical disk and air, the contact portion between the optical disk and air is the upper stream of the air flow and the air flow sequentially flows in a direction moving away from the optical disk. Accordingly, foreign matter, such as dust generated from the drive member, is discharged in the direction moving away from the optical disk also along the flow of the air flow. It thus becomes possible to prevent adverse effects of foreign matter, such as dust generated from the drive member. Further, because at least a part of the stator of the drive member is exposed, members that are otherwise disposed in the exposed portion can be omitted. It is therefore possible to make the optical head thinner by making the drive member smaller, which makes it possible to make the optical disk recording/reproducing device thinner.

INDUSTRIAL APPLICABILITY

The optical head and the optical disk recording/reproducing device of the invention are not only capable of releasing heat generated from the drive member sufficiently but also capable of preventing adverse effects of foreign matter, such as dust generated from the drive member. Moreover, it is possible to make the optical disk recording/reproducing device thinner. The optical head and the optical disk recording/reproducing device of the invention are therefore useful as an optical head to record information in and/or reproduce information from an optical disk and as an optical disk recording/reproducing device employing the optical head.

What is claimed is:

1. An optical disk recording/reproducing device, comprising:
   a rotation member configured to rotate an optical disk; and
   an optical head configured to record information in and/or reproduce information from the optical disk,
   wherein the optical head includes:
   a light source that emits light;
   an objective lens that collects the light emitted from the light source on the optical disk;
   an objective lens actuator that drives the objective lens in a focus direction and a tracking direction of the optical disk;
   a movable member that is disposed in an optical path between the light source and the objective lens;
   a drive member that drives the movable member; and
   an optical base on which the light source, the objective lens actuator, the movable member, and the drive member are mounted, and
   wherein the drive member includes a rotor and a stator and at least a part of the stator is exposed;
   the drive member includes a cover member that encloses the rotor and the stator;
   the cover member has an opening through which at least the part of the stator is exposed;
   the opening includes a long hole formed along a major axis direction of the drive member;
   the rotation member includes a turntable of a circular shape on which the optical disk is loaded; and
   the long hole, when the optical head is at an innermost peripheral position with respect to the optical disk, is positioned on an inner peripheral side of the optical disk from a straight line that is tangent to an outer rim of the turntable and orthogonal to a movement direction of the optical head.

2. The optical disk recording/reproducing device according to claim 1, wherein:
   the opening includes a long hole formed along a direction almost parallel to a radial direction of the optical disk.

3. The optical disk recording/reproducing device according to claim 2, wherein:
   the long hole is provided to the cover member at a position opposing the optical disk.

4. The optical disk recording/reproducing device according to claim 2, wherein:
   the long hole includes a first long hole provided to the cover member at a position opposing the optical disk, and a second long hole provided to the cover member at a position on a side opposite to the optical disk.

5. The optical disk recording/reproducing device according to claim 2, wherein:
   the long hole is provided to the cover member at a position on a side opposite to the optical disk.

6. The optical disk recording/reproducing device according to claim 1, wherein:
   the cover member is made of a non-magnetic material.

7. The optical disk recording/reproducing device according to claim 1, further comprising:
   a base cover member that is fixed to the optical base and covers at least a part of the optical base,
   wherein the base cover member has a base opening provided at a position corresponding to the opening of the cover member.

8. The optical disk recording/reproducing device according to claim 7, wherein:
   the base cover member has a concave portion to guide an air flow induced by rotations of the optical disk inside the drive member at a windward position of the air flow on a rim of the base opening.

9. An optical disk recording/reproducing device, comprising:
   a rotation member configured to rotate an optical disk; and
   an optical head configured to record information in and/or reproduce information from the optical disk,
   wherein the optical head includes:
   a light source that emits light;
   an objective lens that collects the light emitted from the light source on the optical disk;
   an objective lens actuator that drives the objective lens in a focus direction and a tracking direction of the optical disk;
   a movable member that is disposed in an optical path between the light source and the objective lens;
   a drive member that drives the movable member; and
   an optical base on which the light source, the objective lens actuator, the movable member, and the drive member are mounted, and
   a base cover member that is fixed to the optical base and covers at least a part of the optical base,
   wherein the drive member includes a rotor and a stator and at least a part of the stator is exposed;
   the drive member includes a cover member that encloses the rotor and the stator;
   the cover member has an opening through which at least the part of the stator is exposed;
   the base cover member has a base opening provided at a position corresponding to the opening of the cover member; and
   the base cover member has a convex portion to guide an air flow induced by rotations of the optical disk inside the drive member at a downwind position of the air flow on a rim of the base opening.

10. An optical disk recording/reproducing device, comprising:
    a rotation member configured to rotate an optical disk;
    an optical head configured to record information in and/or reproduce information from the optical disk;
    an optical head movement member configured to move the optical head in a radial direction of the optical disk;
    a drive base member configured to hold the optical head, the rotation member, and the optical head movement member; and
    a drive cover member configured to cover at least a part of the optical head, the optical head movement member, and the drive base member,
    wherein the optical head includes:
    a light source that emits light;
    an objective lens that collects the light emitted from the light source on the optical disk;
    an objective lens actuator that drives the objective lens in a focus direction and a tracking direction of the optical disk;
    a movable member that is disposed in an optical path between the light source and the objective lens;
    a drive member that drives the movable member; and an optical base on which the light source, the objective lens actuator, the movable member, and the drive member are mounted, wherein the drive member includes a rotor and a stator and at least a part of the stator is exposed, the drive member includes a cover member that encloses the rotor and the stator; and the cover member has an opening through which at least the part of the stator is exposed, and the drive cover member has a drive opening provided at a position opposing the opening of the cover member.

11. The optical disk recording/reproducing device according to claim 1, wherein:

the movable member includes a collimator lens to correct spherical aberration of the optical head.

12. An optical head, comprising:

a light source that emits light;

an objective lens that collects the light emitted from the light source on an optical disk;

an objective lens actuator that drives the objective lens in a focus direction and a tracking direction of the optical disk;

a movable member that is disposed in an optical path between the light source and the objective lens;

a drive member that drives the movable member;

an optical base on which the light source, the objective lens actuator, the movable member, and the drive member are mounted; and a base cover member that is fixed to the optical base and covers at least a part of the optical base, the base cover member having a base opening, wherein the drive member includes a rotor and a stator and at least a part of the stator is exposed, the drive member is disposed on the optical base at a downwind position of an air flow induced by rotations of the optical disk, and the base cover member has a convex portion to guide the air flow induced by rotations of the optical disk inside the drive member at a downwind position of the air flow on a rim of the base opening.

* * * * *